(12) United States Patent
Edwards et al.

(10) Patent No.: US 11,539,841 B1
(45) Date of Patent: *Dec. 27, 2022

(54) REAL-TIME AGENT ASSISTANCE USING REAL-TIME AUTOMATIC SPEECH RECOGNITION AND BEHAVIORAL METRICS

(71) Applicant: NICE LTD., Ra'anana (IL)

(72) Inventors: Gordon Scott Edwards, Roswell, GA (US); Jon A. Arrowood, Atlanta, GA (US); Mark Finlay, Atlanta, GA (US)

(73) Assignee: NICE LTD., Ra'anana (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/685,938

(22) Filed: Mar. 3, 2022

Related U.S. Application Data

(63) Continuation of application No. 17/386,604, filed on Jul. 28, 2021, now Pat. No. 11,283,928.

(51) Int. Cl.
| | |
|---|---|
| *H04M 3/51* | (2006.01) |
| *G06N 5/02* | (2006.01) |
| *G10L 15/08* | (2006.01) |
| *G10L 25/63* | (2013.01) |

(52) U.S. Cl.
CPC .......... *H04M 3/5175* (2013.01); *G06N 5/025* (2013.01); *G10L 15/08* (2013.01); *G10L 25/63* (2013.01); *G10L 2015/088* (2013.01); *H04M 2201/42* (2013.01); *H04M 2203/402* (2013.01)

(58) Field of Classification Search
CPC .......... H04M 3/5175; H04M 2201/42; H04M 2203/402; G06N 5/025; G10L 15/08; G10L 25/63

USPC .......... 379/265.06, 265.05, 265.07, 265.11, 379/265.13, 265.01, 88.01
See application file for complete search history.

(56) References Cited

U.S. PATENT DOCUMENTS

| | | | |
|---|---|---|---|
| 8,411,841 B2 | 4/2013 | Edwards et al. | |
| 8,654,937 B2 | 2/2014 | Agapi et al. | |
| 9,225,833 B1* | 12/2015 | Koster | H04M 3/42221 |
| 2010/0332287 A1 | 12/2010 | Gates et al. | |
| 2014/0254776 A1* | 9/2014 | O'Connor | H04M 3/5175 379/265.06 |

* cited by examiner

*Primary Examiner* — Thjuan K Addy
(74) *Attorney, Agent, or Firm* — Haynes and Boone, LLP

(57) ABSTRACT

A method of assisting an agent in real-time includes receiving a call interaction between a customer and an agent; identifying words spoken in the call interaction; providing the words to a behavioral models module; computing a score for a plurality of behavioral metrics; providing a phrase formed by the words to a knowledge article selection module; providing each score for the plurality of behavioral metrics to the knowledge article selection module; providing a plurality of knowledge selection rules to the knowledge article selection module; evaluating a combination of the phrase and the scores of the plurality of behavioral metrics against each of the plurality of knowledge selection rules; matching a knowledge selection rule to the combination; selecting a knowledge article associated with the matched knowledge selection rule; generating a visual representation of the selected knowledge article; and presenting in real-time the visual representation on a graphical user interface.

20 Claims, 5 Drawing Sheets

REAL-TIME AGENT ASSISTANCE USING REAL-TIME AUTOMATIC SPEECH RECOGNITION AND BEHAVIORAL METRICS

CROSS REFERENCE TO RELATED APPLICATIONS

This patent application is a continuation application of U.S. application Ser. No. 17/386,604, filed Jul. 28, 2021, now allowed, the entire contents of which is hereby incorporated herein by express reference thereto.

TECHNICAL FIELD

The present disclosure relates generally to providing real-time agent assistance, and more specifically to systems and methods for providing real-time agent assistance based on a combination of spoken words and multiple behavioral metrics.

BACKGROUND

Companies often use contact centers to address customer inquiries, take customer orders and/or resolve customer problems. Contact center agents are the direct connection a company has with its customers. Thus, an unsatisfactory experience with an agent can adversely affect a customer's perception of the company. It is therefore important to provide these agents with real-time assistance to improve the quality and efficiency of customer service interactions.

Accordingly, a need exists for improved systems and methods for assisting agents in real-time, during live customer interactions.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
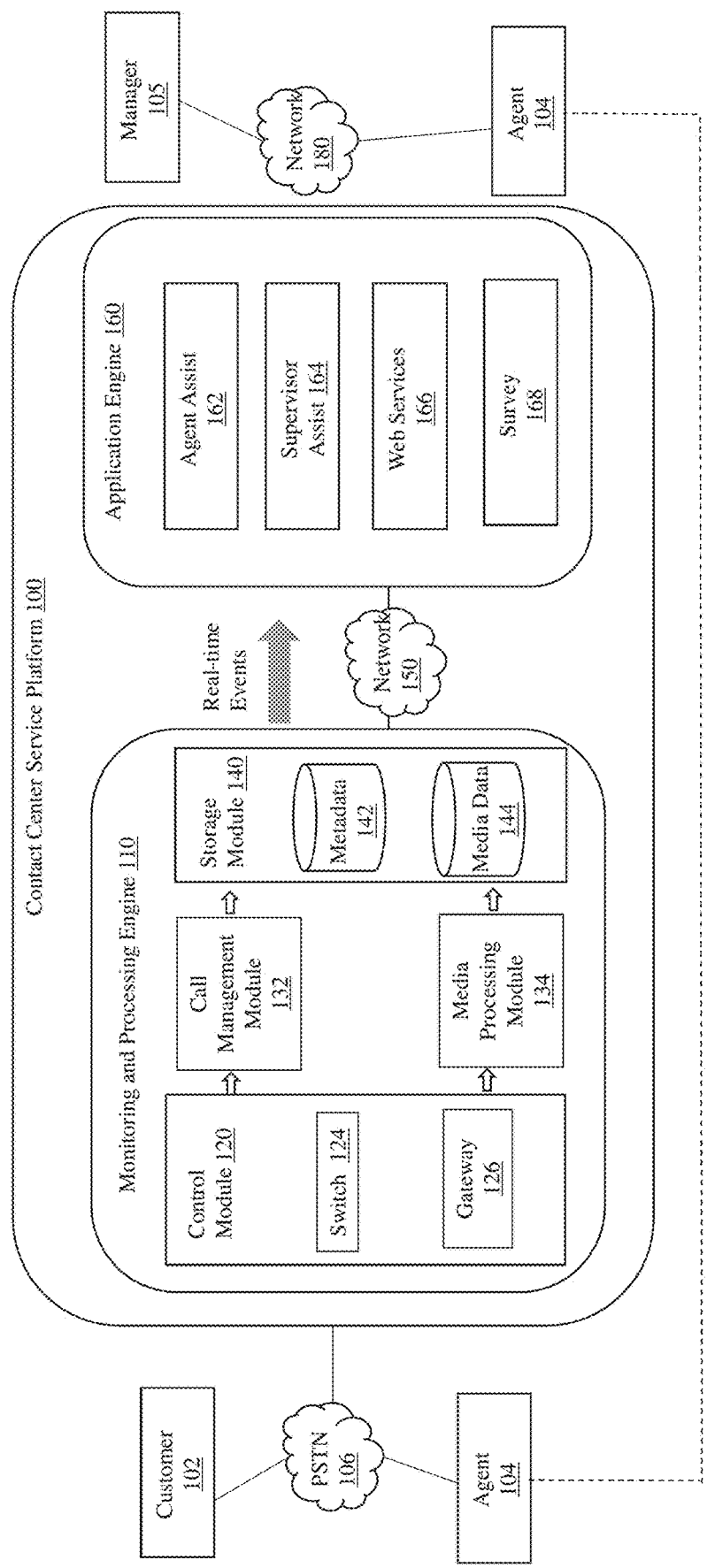
FIG. 1 is a block diagram of an embodiment of a contact center service platform with integrated call monitoring and analysis according to various aspects of the present disclosure.

This description and the accompanying drawings that illustrate aspects, embodiments, implementations, or applications should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail as these are known to one of ordinary skill in the art.

In this description, specific details are set forth describing some embodiments consistent with the present disclosure. Numerous specific details are set forth in order to provide a thorough understanding of the embodiments. It will be apparent, however, to one of ordinary skill in the art that some embodiments may be practiced without some or all of these specific details. The specific embodiments disclosed herein are meant to be illustrative but not limiting. One of ordinary skill in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

The systems and methods described herein improve contact center agent performance by integrating real-time call monitoring with speech analytics to present agents with information useful to handling of current calls. Real-time automatic speech recognition (ASR) techniques are applied to process live audio streams into text. The text is then scored for a plurality of behavioral metrics. Behavioral metrics measure the actions of the agent. Examples of behavioral metrics include, but are not limited to, sentiment, active listening, empathy, demonstration of ownership, building rapport, setting expectations, effective questioning, promotion of self-service, speech velocity, or interruption, or any combination thereof. A combination of the text and scores of the selected behavioral metrics are then used to identify which knowledge articles should be presented to agents to drive more efficient business processes. Advantageously, use of the text to compute multiple behavioral metrics and generate alerts based on the combinations of the behavioral metrics provides a richer agent experience and more robust knowledge article selection.

For example, if the score for the behavioral metric of empathy is low (which is bad), the score of the behavioral metric of sentiment is high (which is bad), and the phrase "cancel my account" is spoken by a customer, then the agent handling the call interaction can be notified that he or she needs to be more empathetic, and the knowledge article "Be Empathetic" may be presented to the agent.

Generally, the present methods allow contact center agents and managers to review and relate ongoing and past call interactions (for instance, occurred with the same customer, or occurred with the same agent and one or more other customers under similar circumstances) to gain valuable business insights. The methods described herein can be applied in many contact center contexts to benefit both contact center performance and customer experience. For instance, such methods can help contact centers increase efficiency, reduce average handling time, increase compliance/risk mitigation, or increase sales effectiveness, or any combination thereof. The methods can also help increase quality assurance and supervisor effectiveness. By providing customers with improved calling experiences, contact centers or the associated business entities can also increase customers' brand affinity and create stronger relationships with consumers.

Referring to FIG. 1, one embodiment of a contact center service platform 100 is configured for providing integrated call monitoring and analytics in real-time. In this embodiment, the contact center service platform 100 implements at least two types of service engines. A monitoring and processing engine 110 is configured for connecting customers and agents (for example, through call interactions), monitoring and managing interactions between those two parties, and extracting useful data from past and ongoing interactions. Based on audio data representative of ongoing interactions and/or the extracted data, a set of application engines 160 are configured for performing content-based analyses (such as to develop a set of knowledge article recommendations), for instance, to help improve agent response and generate targeted messages.

Very generally, a customer 102 contacts a contact center by placing one or more telephone calls through a telecommunication network, for example, via the public switched telephone network (PSTN) 106. In some implementations, the customer 102 may also contact the contact center by initiating data-based communications through a data network (not shown), for example, via the Internet by using voice over internet protocol (VoIP) technology.

Upon receiving an incoming request, a control module 120 in the monitoring and processing engine 110 uses a switch 124 to route the call interaction to a contact center agent 104. Once call connections are established, a media gateway 126 is used to convert voice streams transmitted from the PSTN 106 or from the data network (not shown) into a suitable form of media data compatible for use by a media processing module 134.

In some applications, the media processing module 134 records call interactions received from the media gateway 126 and stores them as media data 144 in a storage module 140. Some implementations of the media processing module 134 are further configured to process the media data to generate non-audio based representations of the media files, such as phonetic audio track (PAT) files that provide a searchable phonetic representation of the media files, based on which the content of the media can be searched. Those non-audio based representations are stored as metadata 142 in the storage module 140.

The monitoring and processing engine 110 also includes a call management module 132 that obtains descriptive information about each call interaction based on data supplied by the control module 120. Examples of such information includes customer identifier (e.g., phone number, IP address, customer number), agent identifiers, call duration, transfer records, day and time of the call, and general categorization of calls (e.g., as determined based on touch-tone input), all of which can be saved as metadata 142 in the storage module 140. In some applications, information stored in the metadata 142 is also cross linked, for instance, agent IDs can be mapped to additional data such as supervisor IDs, sites, etc.

Data in the storage module 140 can be accessed by the application engines 160 over a data network 150. Depending on the particular implementation, the application engines 160 may include a set of functional engines, each configured for a different analytic task. Examples include an agent assist engine 162, a supervisor assist engine 164, a web services engine 166, and a survey engine 168, or any combination thereof. Contact center agents 104 and managers 105 can interact with some or all of the application engines 160 through a data network 180, which may or may not be the same as the data network 150 coupling the two types of service engines 110 and 160.

In some applications, the monitoring and processing engine 110 is also configured to pass data representative of real-time events through the data network 150 for use by one or more application engines 160. One example of data representative of real-time events includes a stream of audio signals (or processed audio signals) representative of an ongoing conversation between an agent and a customer.

By analyzing the content of the on-going conversations (e.g., based on the data passed via the data network 150) and associating the conversations with existing knowledge (e.g., based on metadata such as caller ID and caller history), one or more of the application engines 160 are configured to deliver real-time support to help agents and managers to properly respond to customers' concerns and interests, thereby improving contact center performance and overall customer satisfaction.

One example of an application engine 160 is an agent assist engine 162 configured for monitoring conversations in real-time to provide agents with targeted messages and knowledge articles relevant to the ongoing conversation and/or the present caller. Agent assist engine 162 can help contact center agents reduce talk time and improve service by delivering the right information efficiently to the customer at the right time. It can also help the contact center or associated business entities to maximize revenue opportunities (e.g., by prompting the agents to suggest accessories, promotions, incentives, and other business information relevant to each such customer).

Another example of an application engine is supervisor assist engine 164, which is configured to enable a contact center supervisor to track multiple agent-customer interactions in parallel and to listen to (and/or participate in) ongoing call interactions if there is a need. In one embodiment, supervisor assist engine 164 provides a cut-through transmission between an audio input associated with a supervisor and one or more audio channels associated with the agent and the customer currently involved in the call interaction.

Figure 2:
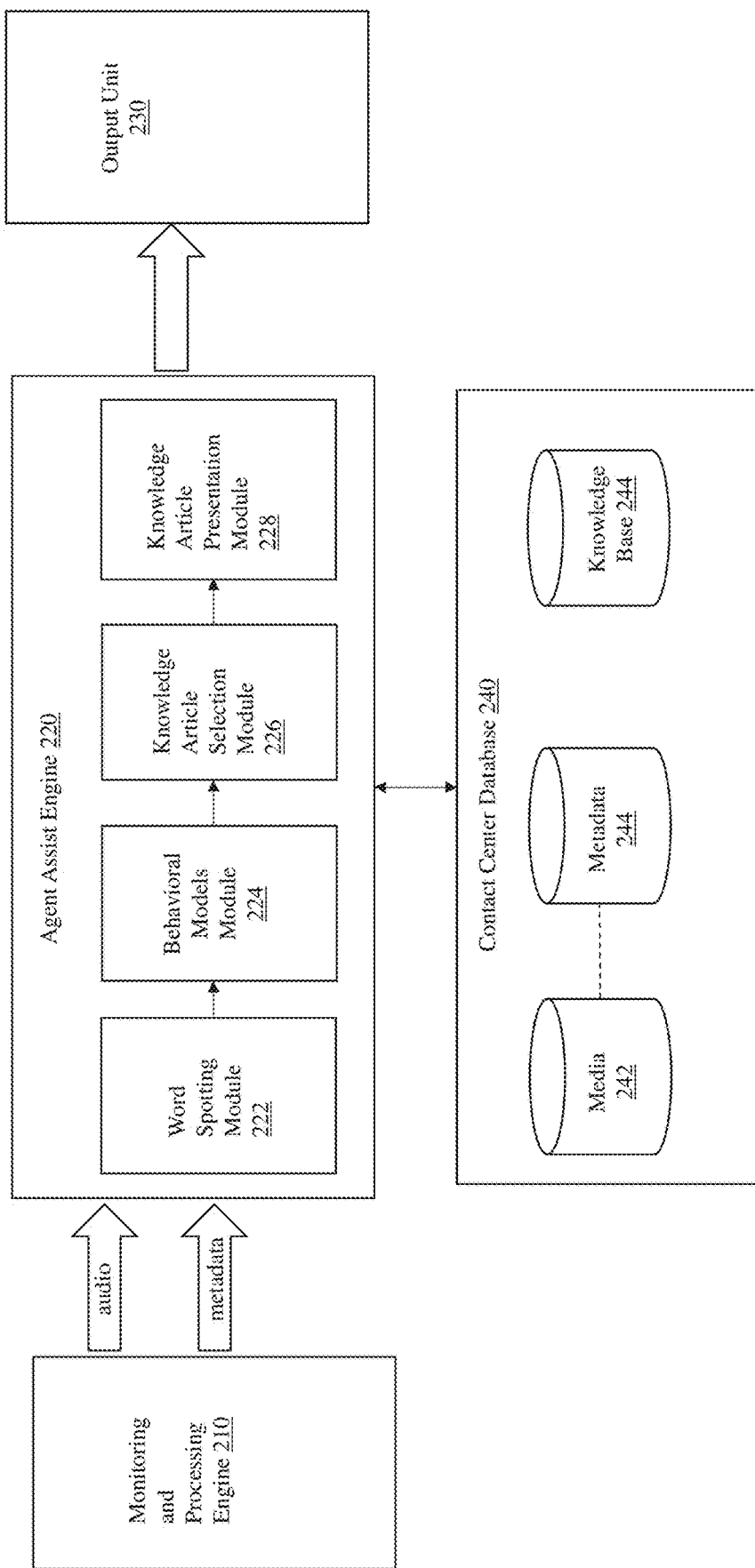
FIG. 2 is a block diagram of an embodiment of an agent assist application engine according to various aspects of the present disclosure.

Referring to FIG. 2, one embodiment of an agent assist engine 220 includes a word spotting module 222, a behavioral models module 224, a knowledge article selection module 226, and a knowledge article presentation module 228. FIG. 2 may also apply to supervisor assist engine 164.

The word spotting module 222 accepts input data provided by monitoring and processing engine 210 to identify putative occurrences of spoken phrases in the conversation. In this example, the input data includes audio data representative of a call interaction between a caller and an agent, for example, in the form of a textual representation determined by real-time ASR of audio signals. Real-time ASR techniques are applied to the audio data to identify whether the conversation includes predefined key words or phrases (e.g., "mortgage," "equity," or "payment"). In certain embodiments, word spotting module 222 generates word decisions, offsets, and score information for every recognized utterance. Scores represent the likelihood of the word reported by word spotting module 222 being correct based on the phonetic match derived from the raw audio data and the ASR language model. In other words, the scores represent the likelihood that the word would appear in the specific word sequence or phrase. Phrase (multi-word) scores are typically generated as some function of the individual word scores. In some embodiments, the score may be used to weigh the influence of a given word in a subsequent analysis. A lower scoring (less likely) word may be ignored altogether (if confidence is very low and below a given threshold), or its contribution to the final behavioral metric score may be weighted by its likelihood score to improve the accuracy of the behavioral model reporting.

The results of word spotting are then provided to the behavioral models module 224 to compute multiple selected behavioral metrics (e.g., sentiment, empathy, promotes self-service) on each recognized phrase. In some embodiments, scores for the selected behavioral metrics are cumulative throughout the conversation, or a particular phase of the conversation. In various embodiments, behavioral models module 224 turns the ASR words into phrase-based feature spaces and applies machine-learning techniques to develop scores for various agent-based metrics, such as sentiment, empathy, warm and friendly, sets expectations, and/or listens actively. In several embodiments, a score for a behavioral metric is based primarily on the words or phrases provided by word spotting module 222, and can also be based on non-text attributes of the call interaction, such as volume (e.g., yelling), tone and/or pitch.

The recognized phrases and behavioral metrics are then passed to a knowledge article selection module 226, which accesses a knowledge base 244 in a contact center database 240 to select a set of knowledge articles for presentation to the agent. The knowledge base 244 provides a repository in which the contact center stores knowledge articles. A knowledge article contains information that can be distributed to agents in response to a call interaction.

In some embodiments, the selection of knowledge articles is based at least on a determined relevance of each knowledge article with the identified phrases. For instance, each key phrase is mapped to a respective knowledge article in the knowledge base 244 with a corresponding relevance score. An article promoting mortgage products may have a high relevance score to the key phrase "mortgage," and a low score to the key phrase "sport." Based on these individual relevance scores, the relevance of a knowledge article to an ongoing conversation can be determined by combining the relevance scores of the article to the key phrase(s) identified in the conversation. Subsequently, a knowledge article whose combined relevance score to the conversation is higher than a threshold score can be placed in a candidate set of knowledge articles for presentation to the agent. In some examples, the combined relevance score of a knowledge article is determined dynamically. For instance, an initial relevance score is generated by processing a first segment of the audio data of the conversation, and this score is iteratively updated based on the processing of the succeeding segments of the audio data.

Likewise, more complex article selection rules can combine recognized phrases and multiple behavioral metrics computed from different behavioral metric models to select more appropriate articles for agent consumption. For example, knowledge article selection module 226 can utilize both phrases and computed behavioral metrics to select agent information to present based on user-defined rules.

In various embodiments, given a set of user-defined rules that are associated with knowledge articles, the phrases and computed behavioral metrics can be evaluated against the rule set and any matching rule has its knowledge article presented to the agent. Rules can combine results and/or one or more behavioral metrics to allow robust call circumstances to be considered.

In addition to the word spotting results, knowledge article selection module 226 can also make use of metadata associated with the call interaction to identify relevant knowledge articles. For instance, by obtaining caller ID information, analyzing caller-specific history of contact center interactions, and/or analyzing caller-specific history of product acquisition, knowledge article selection module 226 can extract information about a particular caller's concerns and interests. Using such caller-specific information in conjunction with the content of the conversation, personalized knowledge article selection can be performed.

Once a knowledge article or a set of knowledge articles is determined, knowledge article selection module 226 outputs data representing the identified knowledge article(s) to knowledge article presentation module 228. Knowledge article presentation module 228 forms a visual representation of the identified knowledge article(s) for presentation on an output unit 230 (e.g., on the agent's or supervisor's computer screen). The knowledge article can be presented in various forms to deliver real-time support to one or more agents.

Figure 3:
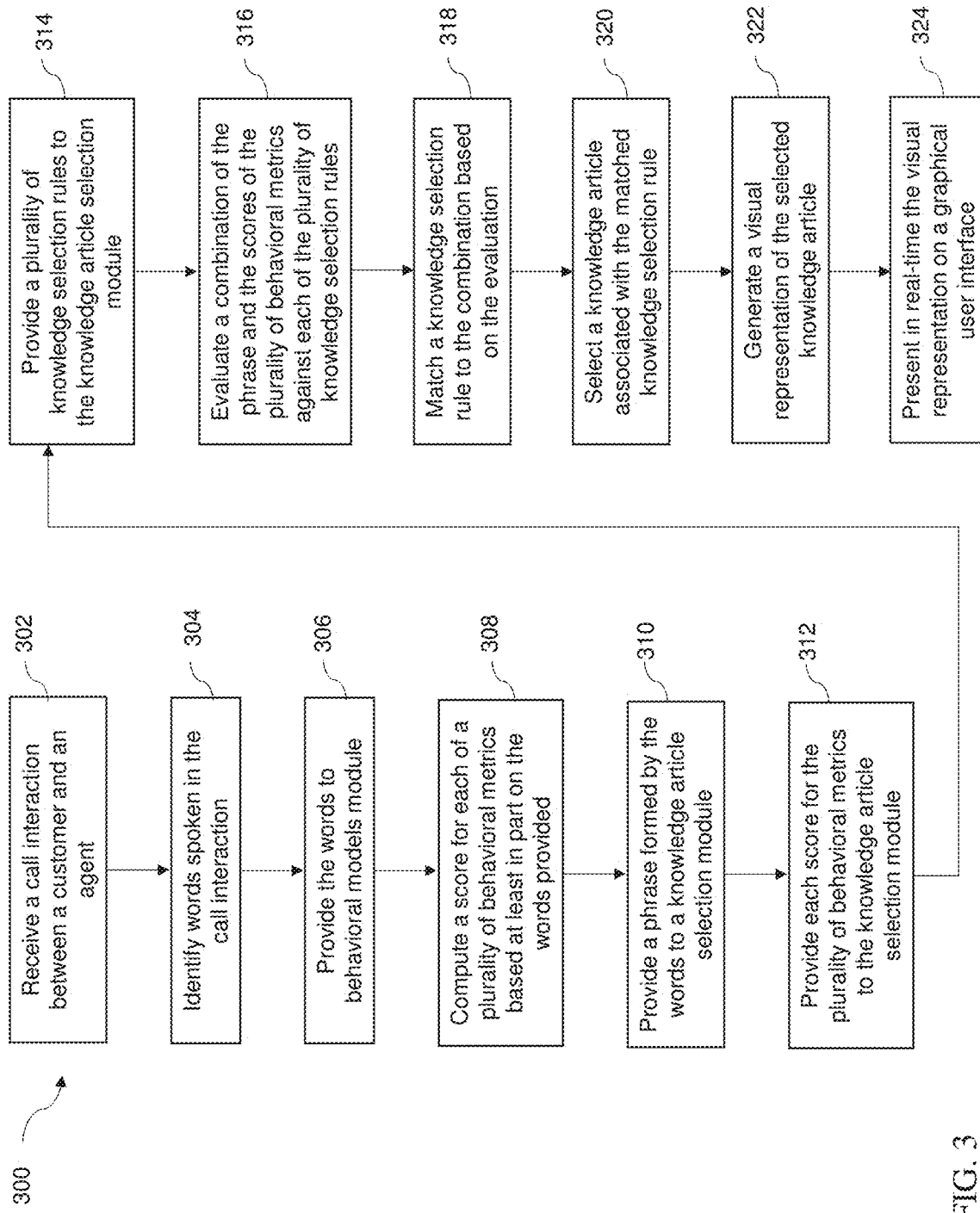
FIG. 3 is a flowchart of a method according to embodiments of the present disclosure.

Referring now to FIG. 3, a method 300 according to embodiments of the present disclosure is described. At step 302, monitoring and processing engine 210 receives a call interaction between a customer and an agent.

At step 304, agent assist engine 220, via word spotting module 222, identifies words spoken in the call interaction. In various embodiments, real-time ASR techniques are used to transform audio data into text. With real-time ASR, voice technology can detect spoken sounds and recognize them as words. Advantageously, this eliminates the need to predefine phrases of interest and thresholding those phrases.

In some embodiments, word spotting module 222 identifies time locations in the call interaction at which a spoken instance of a word occurred. In several embodiments, word spotting module 222 also determines whether the agent or the customer spoke the word.

At step 306, agent assist engine 220, via word spotting module 222, provides the words to behavioral models module 224.

At step 308, agent assist engine 220, via behavioral models module 224, computes a score for each of a plurality of behavioral metrics based at least in part on the words provided by word spotting module 222. The behavioral metrics to be scored are typically either manually selected in advance or are selected based on the words provided by the word spotting module 222. In various embodiments, the plurality of behavioral metrics includes two or more of sentiment, active listening, empathy, demonstration of ownership, building rapport, setting expectations, effective questioning, promotion of self-service, speech velocity, or interruption. In some embodiments, behavioral models module 224 also takes into account non-text based attributes of the call interaction, such as volume, pitch, and/or tone. In certain embodiments, behavioral models module 224 computes a score for about 7-12 behavioral metrics.

In several embodiments, a machine learning (ML) model is trained to output a score for each behavioral metric based on features extracted from previous call interactions. The model may be trained in a training phase using labeled or tagged call interactions, e.g., call interactions that were associated or annotated with one or more behavioral labels, grades, scores or ratings that may grade the call with respect to one trait or attribute of a set of attributes or behavioral metrics. The trained ML model may then be used to calculate behavioral analytics of incoming call interactions. The behavioral analytics may include a plurality of behavioral metrics or attributes, and various embodiments may provide a score or rating for each of these behavioral metrics or attributes for each analyzed call interaction.

In various embodiments, when behavioral metric models are trained to output a score for a behavioral metric, thresholds can be selected to correspond to a low score, a neutral score, and a high score. For example, "empathy" scores below 0.3 might be considered low, scores above 0.7 may be considered high, and all other scores may be considered neutral. How low/neutral/high scores are interpreted can be decided by a user and defined in the rule. That is, a behavioral metric with a low score may be considered "good," while a different behavioral metric with a low score may be considered "bad." The appropriate thresholds might change between different behavioral metrics, as well, where scores below 0.2 might be considered low and above 0.8 might be considered high, for one behavioral metric, and below 0.35 and above 0.65 might be low and high for another behavioral metric.

In some embodiments, behavioral models module 224 computes the score for each of the plurality of behavioral metrics by processing a first word to generate an initial score for each of the plurality of behavioral metrics, and processing one or more additional words to iteratively update the initial scores. For example, for the phrase "This is frustrating," the score may be computed as follows:

THIS: Empathy Score: 0.2; Sentiment Score: 0.4
IS: Empathy Score: 0.2; Sentiment Score: 0.4
FRUSTRATING: Empathy Score: 0.2; Sentiment Score: 0.7

At step 310, agent assist engine 220, via word spotting module 222, provides a phrase formed by the words to knowledge article selection module 226. In the above example, "This is frustrating" would be provided to knowledge article selection module 226.

At step 312, agent assist engine 220, via behavioral models module 224, provides each score for the plurality of behavioral metrics to knowledge article selection module 226.

At step 314, contact center database 240, via knowledge base 244, provides a plurality of knowledge selection rules to knowledge article selection module 226. Each knowledge selection rule is associated with a knowledge article. In some embodiments, knowledge base 244 receives the plurality of knowledge selection rules from a user.

At step 316, agent assist engine 220, via knowledge article selection module 226, evaluates a combination of the phrase and the scores of the plurality of behavioral metrics against each of the plurality of knowledge selection rules. For example, knowledge article selection module 226 evaluates the rule provided in step 314 against the scores computed in step 308 and the phrase provided in step 310.

At step 318, agent assist engine 220, via knowledge article selection module 226, matches a knowledge selection rule to the combination based on the evaluation.

At step 320, agent assist engine 220, via knowledge article selection module 226, selects a knowledge article associated with the matched knowledge selection rule. In various embodiments, the selected knowledge article includes content associated with promotions, incentives, products, product accessories, services, service enhancements, or agent-assisting content.

At step 322, agent assist engine 220, via knowledge article presentation module 228, generates a visual representation of the selected knowledge article.

At step 324, agent assist engine 220, via knowledge article presentation module 228, presents in real-time the visual representation on a graphical user interface. In some embodiments, the visual representation includes an alert, a message, a score, or a combination thereof.

Figure 4:
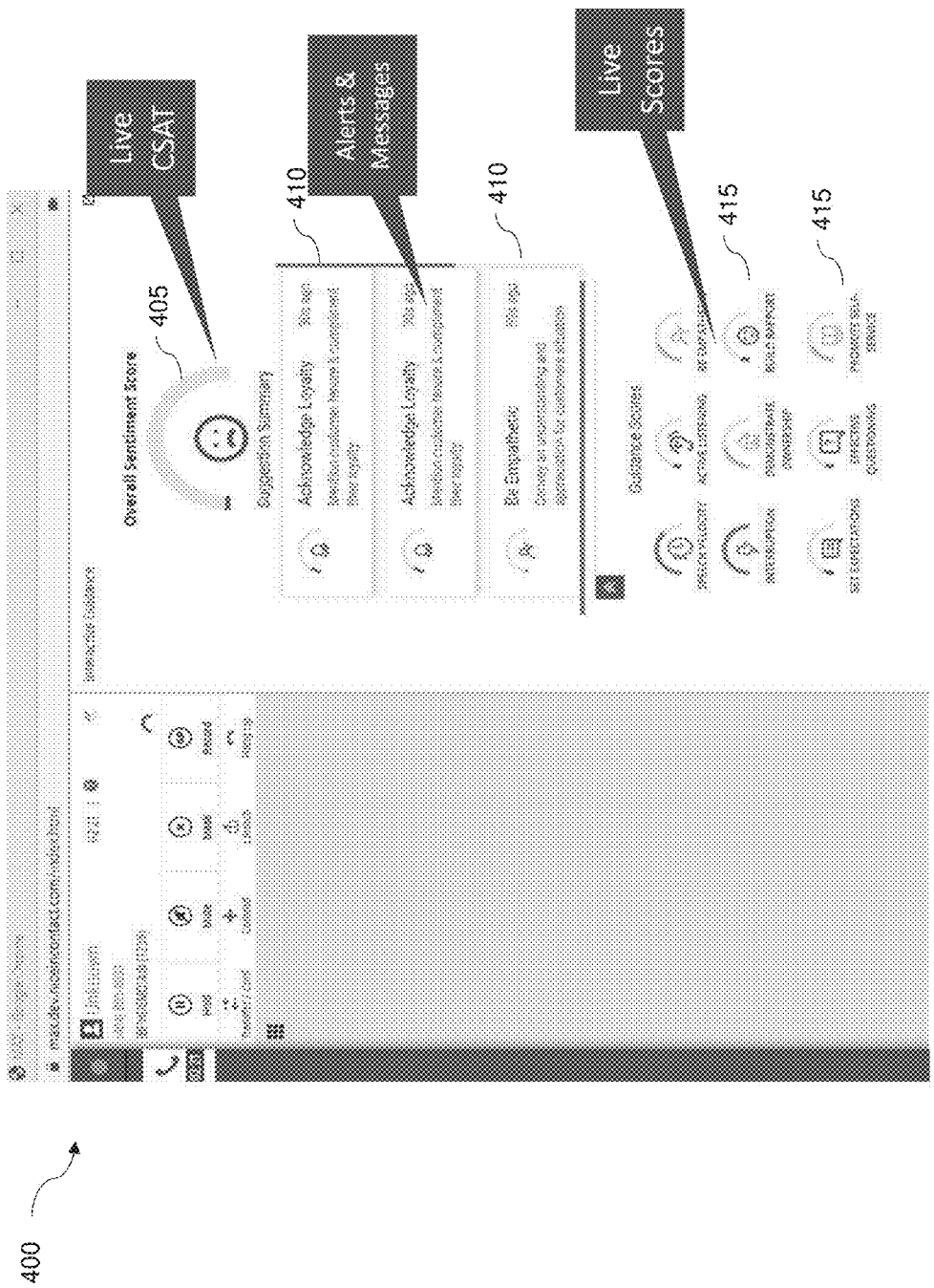
FIG. 4 is an exemplary visual representation that may be presented to an agent in real-time during a call transaction according to various aspects of the present disclosure.

FIG. 4 is an exemplary visual representation 400 of multiple knowledge articles that may be presented to an agent or an agent supervisor on a graphical user interface in real-time. Visual representation 400 includes a real-time customer satisfaction score 405, various alerts 410, and several real-time guidance scores 415. As seen in FIG. 4, the customer satisfaction score 405 may be visually indicated by a sad face and/or red text, indicating a low or poor score. The alerts 410 include an article name and a brief description of the alert, along with the time the alert was provided. In some embodiments, the user interface can be configured to provide various functionalities to help agents respond rapidly to changing business needs and consumer interests. For example, the content of knowledge articles can account for and include promotions, incentives, service alerts, new products, product accessories, and/or service enhancements. In another embodiment, the content of knowledge articles can further account for recent interactions between the customer and the company. Guidance scores 415 provide the scores for a plurality of behavioral metrics, and can be color-coded to reflect a low (e.g., red), neutral (e.g., yellow), or high (e.g., green) score.

In certain embodiments, knowledge base 244 receives an updated plurality of knowledge selection rules from the user. Knowledge article selection module 226 then re-evaluates the combination of the phrase and the scores of the plurality of behavioral metrics against each of the updated plurality of knowledge selection rules, re-matches an updated knowledge selection rule to the combination based on the evaluation, re-selects a knowledge article associated with the updated matched knowledge selection rule. The selected knowledge article can then be presented to the agent or agent supervisor.

A specific example of method 300 is now described in more detail below.

Knowledge base 244 receives and stores the following user-defined rule:

If "empathy" is low (<0.3=bad)
and "sentiment" is high (>0.65=bad)
and the customer says, "this is frustrating,"
then present the knowledge article "Be Empathetic."

Certain behavioral metrics (e.g., empathy) may only be important when other behavioral metrics (e.g., sentiment) is bad. Word spotting module 222 provides the words "this," "is," and "frustrating" to behavioral models module 224. Behavioral models module 224 computes the following scores for the behavioral metrics:

THIS: Empathy Score: 0.2; Sentiment Score: 0.4
IS: Empathy Score: 0.2; Sentiment Score: 0.4
FRUSTRATING: Empathy Score: 0.2; Sentiment Score: 0.7

Word spotting module 222 provides the phrase "this is frustrating" to knowledge article selection module 226, and behavioral models module 224 provides the empathy score of 0.2 and the sentiment score of 0.7 to knowledge article selection module 226. Knowledge article selection module 226 evaluates the rule against the incoming data stream and determines the phrase "this is frustrating" has been matched, and at that time "empathy" at 0.2 is low (<0.3=bad) and "sentiment" at 0.7 is high (>0.65 is bad). Therefore, the knowledge article "Be Empathetic" is selected and an alert containing the article is presented to the agent.

Figure 5:
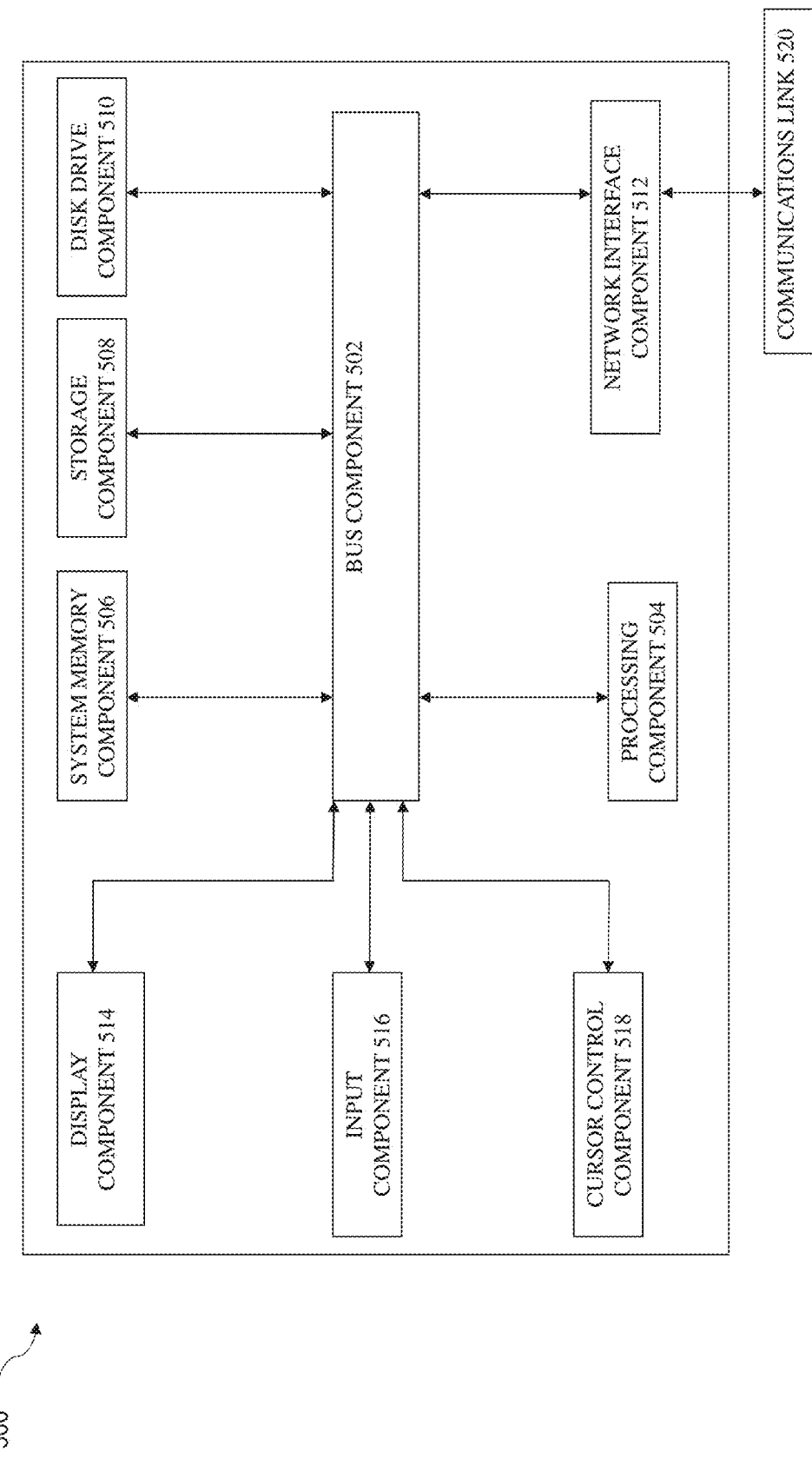
FIG. 5 is a block diagram of a computer system suitable for implementing one or more components in FIG. 1 or 2 according to one embodiment of the present disclosure.

Referring now to FIG. 5, illustrated is a block diagram of a system 500 suitable for implementing embodiments of the present disclosure, including monitoring and processing engine 110 and application engine 160. System 500, such as part a computer and/or a network server, includes a bus 502 or other communication mechanism for communicating information, which interconnects subsystems and components, including one or more of a processing component 504 (e.g., processor, micro-controller, digital signal processor (DSP), etc.), a system memory component 506 (e.g., RAM), a static storage component 508 (e.g., ROM), a network interface component 512, a display component 514 (or alternatively, an interface to an external display), an input component 516 (e.g., keypad or keyboard), and a cursor control component 518 (e.g., a mouse pad).

In accordance with embodiments of the present disclosure, system 500 performs specific operations by processor 504 executing one or more sequences of one or more instructions contained in system memory component 506. Such instructions may be read into system memory component 506 from another computer readable medium, such as static storage component 508. These may include instructions to receive a call interaction between a customer and an agent, identify words spoken in a call interaction, provide the words to a behavioral models module, compute a score for each of a plurality of behavioral metrics based at least in part on the words provided by the word spotting module, provide a phrase formed by the words to a knowledge article selection module, provide each score for the plurality of behavioral metrics to the knowledge article selection module, provide a plurality of knowledge selection rules to the knowledge article selection module, evaluate a combination of the phrase and the scores of the plurality of behavioral metrics against each of the plurality of knowledge selection rules, match a knowledge selection rule to the combination based on the evaluation, select a knowledge article associated with the matched knowledge selection rule, generate a visual representation of the selected knowledge article, present in real-time the visual representation on a graphical user interface. In other embodiments, hard-wired circuitry may be used in place of or in combination with software instructions for implementation of one or more embodiments of the disclosure.

Logic may be encoded in a computer readable medium, which may refer to any medium that participates in providing instructions to processor 504 for execution. Such a medium may take many forms, including but not limited to, non-volatile media, volatile media, and transmission media. In various implementations, volatile media includes dynamic memory, such as system memory component 506, and transmission media includes coaxial cables, copper wire, and fiber optics, including wires that comprise bus 502. Memory may be used to store visual representations of the different options for searching or auto-synchronizing. In one example, transmission media may take the form of acoustic or light waves, such as those generated during radio wave and infrared data communications. Some common forms of computer readable media include, for example, RAM, PROM, EPROM, FLASH-EPROM, any other memory chip or cartridge, carrier wave, or any other medium from which a computer is adapted to read.

In various embodiments of the disclosure, execution of instruction sequences to practice the disclosure may be performed by system 500. In various other embodiments, a plurality of systems 500 coupled by communication link 520 may perform instruction sequences to practice the disclosure in coordination with one another. Computer system 500 may transmit and receive messages, data, information and instructions, including one or more programs (i.e., application code) through communication link 520 and communication interface 512. Received program code may be executed by processor 504 as received and/or stored in disk drive component 510 or some other non-volatile storage component for execution.

The Abstract at the end of this disclosure is provided to comply with 37 C.F.R. § 1.72(b) to allow a quick determination of the nature of the technical disclosure. It is submitted with the understanding that it will not be used to interpret or limit the scope or meaning of the claims.

What is claimed is:

1. A real-time agent assistance system comprising:
    a processor and a computer readable medium operably coupled thereto, the computer readable medium comprising a plurality of instructions stored in association therewith that are accessible to, and executable by, the processor, to perform operations which comprise:
        receiving a call interaction between a customer and an agent;
        providing, by a word spotting module to a knowledge selection module, a phrase formed by words spoken in the call interaction;
        providing, by a behavioral models module to a knowledge article selection module, a score for each of a plurality of behavioral metrics that are based at least in part on the words spoken in the call interaction;
        providing a plurality of knowledge selection rules to the knowledge article selection module, wherein each knowledge selection rule is associated with a knowledge article;
        evaluating, by the knowledge article selection module, a combination of the phrase and the scores for the plurality of behavioral metrics against each of the plurality of knowledge selection rules;
        matching, by the knowledge article selection module, a knowledge selection rule to the combination based on the evaluation;
        selecting, by the knowledge article selection module, a knowledge article associated with the matched knowledge selection rule; and
        presenting, in real-time, by a knowledge article presentation module to the agent or an agent supervisor, a representation of the selected knowledge article on a graphical user interface.

2. The real-time agent assistance system of claim 1, wherein the operations further comprise:
    identifying, by the word spotting module, the words spoken in the call interaction;
    providing, by the word spotting module to the behavioral models module, the words spoken in the call interaction; and
    computing, by the behavioral models module, the score for each of the plurality of behavioral metrics.

3. The real-time agent assistance system of claim 2, wherein computing the score for each of the plurality of behavioral metrics comprises:
    processing a first word to generate an initial score for each of the plurality of behavioral metrics; and
    processing one or more additional words to iteratively update the initial scores.

4. The real-time agent assistance system of claim 1, wherein the operations further comprise generating, by the knowledge article presentation module, a representation that comprises a visual representation.

5. The real-time agent assistance system of claim 1, wherein the plurality of behavioral metrics comprises two or more of sentiment, active listening, empathy, demonstration of ownership, building rapport, setting expectations, effective questioning, promotion of self-service, speech velocity, or interruption.

6. The real-time agent assistance system of claim 1, wherein the operations further comprise identifying time locations in the call interaction at which a spoken instance of a word occurred.

7. The real-time agent assistance system of claim 6, wherein the operations further comprise determining whether the agent or the customer spoke the word.

8. The real-time agent assistance system of claim 1, wherein the operations further comprise receiving the plurality of knowledge selection rules from a user.

9. The real-time agent assistance system of claim 8, wherein the operations further comprise:
  receiving an updated plurality of knowledge selection rules from the user;
  re-evaluating, by the knowledge article selection module, the combination of the phrase and the scores for the plurality of behavioral metrics against each of the updated plurality of knowledge selection rules;
  re-matching, by the knowledge article selection module, an updated knowledge selection rule to the combination based on the evaluation; and
  re-selecting, by the knowledge article selection module, a knowledge article associated with the updated matched knowledge selection rule.

10. The real-time agent assistance system of claim 4, wherein the visual representation comprises an alert, a message, a score, or a combination thereof.

11. A method of assisting an agent in real-time, which comprises:
  receiving a call interaction between a customer and an agent;
  providing, by a word spotting module to the knowledge selection module, a phrase formed by words spoken in the call interaction to a knowledge selection module;
  providing, by a behavioral models module to a knowledge article selection module, a score for each of a plurality of behavioral metrics that are based at least in part on the words spoken in the call interaction;
  providing a plurality of knowledge selection rules to the knowledge article selection module, wherein each knowledge selection rule is associated with a knowledge article;
  evaluating, by the knowledge article selection module, a combination of the phrase and the scores for the plurality of behavioral metrics against each of the plurality of knowledge selection rules;
  matching, by the knowledge article selection module, a knowledge selection rule to the combination based on the evaluation;
  selecting, by the knowledge article selection module, a knowledge article associated with the matched knowledge selection rule; and
  presenting, in real-time, by a knowledge article presentation module to the agent or an agent supervisor, a visual representation of the selected knowledge article on a graphical user interface.

12. The method of claim 11, wherein the plurality of behavioral metrics comprise two or more of sentiment, active listening, empathy, demonstration of ownership, building rapport, setting expectations, effective questioning, promotion of self-service, speech velocity, or interruption.

13. The method of claim 11, further comprising identifying time locations in the call interaction at which a spoken instance of a word occurred.

14. The method of claim 13, further comprising determining whether the agent or the customer spoke the word.

15. The method of claim 11, further comprising receiving the plurality of knowledge selection rules from a user.

16. A non-transitory computer-readable medium having stored thereon computer-readable instructions executable by a processor to perform operations which comprise:
  receiving a call interaction between a customer and an agent;
  providing, by a word spotting module to a knowledge selection module, a phrase formed by words spoken in the call interaction;
  providing, by a behavioral models module to a knowledge article selection module, a score for each of a plurality of behavioral metrics that are based at least in part on the words spoken in the call interaction;
  providing a plurality of knowledge selection rules to the knowledge article selection module, wherein each knowledge selection rule is associated with a knowledge article;
  evaluating, by the knowledge article selection module, a combination of the phrase and the scores for the plurality of behavioral metrics against each of the plurality of knowledge selection rules;
  matching, by the knowledge article selection module, a knowledge selection rule to the combination based on the evaluation;
  selecting, by the knowledge article selection module, a knowledge article associated with the matched knowledge selection rule; and
  presenting, in real-time, by a knowledge article presentation module to the agent or an agent supervisor, a visual representation of the selected knowledge article on a graphical user interface.

17. The non-transitory computer-readable medium of claim 16, wherein the plurality of behavioral metrics comprise two or more of sentiment, active listening, empathy, demonstration of ownership, building rapport, setting expectations, effective questioning, promotion of self-service, speech velocity, or interruption.

18. The non-transitory computer-readable medium of claim 16, wherein the operations further comprise identifying time locations in the call interaction at which a spoken instance of a word occurred, and determining whether the agent or the customer spoke the word.

19. The non-transitory computer-readable medium of claim 16, wherein the operations further comprise receiving the plurality of knowledge selection rules from a user.

20. The non-transitory computer-readable medium of claim 19, wherein the operations further comprise:
  receiving an updated plurality of knowledge selection rules from the user;
  re-evaluating, by the knowledge article selection module, the combination of the phrase and the scores for the plurality of behavioral metrics against each of the updated plurality of knowledge selection rules;
  re-matching, by the knowledge article selection module, an updated knowledge selection rule to the combination based on the evaluation; and
  re-selecting, by the knowledge article selection module, a knowledge article associated with the updated matched knowledge selection rule.

* * * * *